United States Patent
Kojima et al.

(10) Patent No.: US 7,142,824 B2
(45) Date of Patent: Nov. 28, 2006

(54) ANTENNA DEVICE WITH A FIRST AND SECOND ANTENNA

(75) Inventors: Noriharu Kojima, Kanagawa (JP); Hideki Watanabe, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/530,663

(22) PCT Filed: Aug. 28, 2003

(86) PCT No.: PCT/JP03/10973

§ 371 (c)(1),
(2), (4) Date: Apr. 6, 2005

(87) PCT Pub. No.: WO2004/032283

PCT Pub. Date: Apr. 15, 2004

(65) Prior Publication Data

US 2005/0277387 A1 Dec. 15, 2005

(30) Foreign Application Priority Data

Oct. 7, 2002 (JP) .............................. 2002-293822

(51) Int. Cl.
*H04B 1/44* (2006.01)
(52) U.S. Cl. .......................................................... 455/78
(58) Field of Classification Search .................. 455/78, 455/575.7, 562.1
See application file for complete search history.

(56) References Cited

U.S. PATENT DOCUMENTS

2005/0277387 A1* 12/2005 Kojima et al. ................ 455/78

FOREIGN PATENT DOCUMENTS

| CN | 1283012 | | 2/2001 |
|---|---|---|---|
| EP | 1 164 719 | A1 | 12/2001 |
| GB | 2 355 155 | A | 4/2001 |
| JP | 63-191733 | | 12/1988 |
| JP | 2001-036461 | | 2/2001 |
| JP | 2001-244844 | | 9/2001 |
| JP | 2001-285122 | | 10/2001 |
| WO | WO 01/50636 | A1 | 7/2001 |
| WO | WO 2004/032283 | A1 * | 4/2004 |

* cited by examiner

*Primary Examiner*—William D. Cumming
(74) *Attorney, Agent, or Firm*—Pearne & Gordon LLP

(57) ABSTRACT

An antenna device corresponds to a plurality of radio communications systems and frequency bands, can simultaneously carry out a reception and a transmission of different radio communications systems, and is capable of using antenna diversity by a simple construction. An antenna device comprises a first antenna matching with first, second, and third frequency bands, a second antenna matching with the third frequency band, a diplexer and the like. For signals of the first frequency band, a high-frequency switch circuit connects a transmitter or a receiver to the diplexer by switching. For signals of the second frequency band, an additional high-frequency switch connects a receiver or a transmitter to the diplexer by switching. For signals of the third frequency band, the additional high-frequency switch circuit and a further additional high-frequency switch circuit connect the second antenna or diplexer to a transmitter/receiver by switching.

10 Claims, 9 Drawing Sheets

ANTENNA DEVICE WITH A FIRST AND SECOND ANTENNA

TECHNICAL FIELD

The present invention relates to an antenna device which is used for mobile communications and which is capable of corresponding to a plurality of frequency bands and a plurality of modulation schemes.

BACKGROUND ART

In recent years, in mobile communications systems represented by mobile telephone systems, the analogue modulation scheme of the first generation has gradually shifted to a digital modulation scheme of a second generation, and still, to a third generation which realizes high data transfer rates and can be used globally seamlessly.

And, for the transition periods between the generations, multi-mode or multi-band radio communications equipment which can correspond to, in addition to the respective existing radio communications systems, new radio communications systems becomes necessary. Furthermore, in such radio communications equipment, an antenna device which can correspond to a plurality of frequency bands has been required.

For example, as the antenna device which can correspond to a plurality of frequency bands, an antenna device as shown in JP-A-2001-285122 (Patent document 1) has been known. This prior-art antenna device is provided with a diplexer which sorts received signals received via the antenna into communications systems corresponding to the DCS system and GSM system different in frequencies and a four-port high-frequency switch for separating into a transmitting portion and a receiving portion of each communications system, which enables downsizing the circuit by reducing the number of components of the mobile communications device.

In addition, as another antenna device, an antenna device which, by use of a high-band high-frequency switch, simply switches power supply to a multi-band antenna having the number of bands equal to the number of corresponding frequencies of an application apparatus has also been considered.

Patent document 1

JP-A-2001-285122 (Page 3, FIG. 1)

However, the conventional antenna devices have had the following problems, and an improvement thereof has been demanded. Namely, in a case where a system using a new frequency band and also using antenna diversity is added to an existing radio communications system not using antenna diversity, a need arises for the antenna device to correspond to both conventional and new frequency bands and also correspond to the diversity. However, if the above-described correspondence is considered in the conventional schemes, this becomes a disincentive, such as preparing an antenna for each of the radio communications systems, to reduction in size and weight, which is important for mobile terminal apparatuses in the mobile communications systems.

In addition, in a case where a new radio communications system and a frequency band are added to conventional models, for example, in a case where the third-generation mobile telephone system is merged with the second-generation mobile telephone system, drastic modifications of the conventional antenna element and antenna circuit have been necessary.

The present invention has been made to solve the problems as described above, and an object thereof is to provide, by a simple construction, an antenna device which corresponds to a plurality of radio communications systems and frequency bands, such as two radio communications systems and three frequency bands, which can simultaneously carry out a reception and a transmission of different radio communications systems, and which is capable of using antenna diversity.

DISCLOSURE OF THE INVENTION

An antenna device of the present invention includes: a first antenna matching with first, second, and third frequency bands; a second antenna matching with the third frequency band; a diplexer for distributing signals received from the first antenna into signals of the first frequency band and signals of the second and third frequency bands; a first switch unit for selecting a first transmitter for transmitting signals of the first frequency band or a first receiver for receiving signals of the first frequency band and connecting the same to the diplexer; a second switch unit for selecting a second receiver for receiving signals of the second frequency band or a second transmitter for transmitting signals of the second frequency band and connecting the same to the diplexer; and a third switch unit for selecting the second antenna or diplexer and connecting the same to a transmitter/receiver for transmitting and receiving signals of the third frequency band.

In the above-described construction, signals received from the first antenna matched with the first, second, and third frequency bands are distributed by the diplexer into signals of the first frequency band and signals of the second and third frequency bands. For signals of the first frequency band, the first switch unit selects the first receiver or first transmitter and connects the same to the diplexer. In addition, for signals of the second frequency band, the second switch unit selects the second receiver or second transmitter and connects the same to the diplexer. For signals of the third frequency band, the third switch unit selects the second antenna or diplexer and connects the same to the transmitter/receiver. Thereby, an antenna device which corresponds to two radio communications systems and three frequency bands, which can simultaneously carry out a reception and a transmission of different radio communications systems, and which is capable of using antenna diversity can be provided by a simple construction. Namely, two antenna systems corresponding to the three frequency bands composed of a dual-band single-mode antenna system of the first and second frequency bands and a single-mode antenna system of the third frequency band can be realized without making drastic modifications. In addition, a reception of signals of the first frequency band and a transmission of signals of the third frequency band can be simultaneously carried out. Furthermore, for signals of the third frequency band, an antenna device capable of using antenna diversity can be simply provided.

In addition, the antenna device is characterized in being provided with an antenna switching connector which is provided between the first antenna and diplexer and which connects, when an external antenna is attached, the external antenna to the diplexer in place of the first antenna.

According to the above-described construction, a dual-mode/multi-band antenna device corresponding to the three frequency bands which can use an external antenna in place of the first antenna can be provided.

In addition, the antenna device is characterized in being provided with a lowpass filter at least either between the first switch unit and first transmitter or between the second switch unit and second transmitter.

According to the above-described construction, a dual-mode/multi-band antenna device corresponding to the three frequency bands which can transmit transmitting waves of transmitting signals whose higher harmonic components have been reduced can be provided.

In addition, the antenna device is characterized in that signals of the first frequency band are signals of a 900 MHz band in a GSM scheme; signals of the second frequency band are signals of a 1800 MHz band in a DCS scheme; and signals of the third frequency band are signals of a 2 GHz band in a WCDMA scheme.

According to the above-described construction, two antenna systems corresponding to the 900 MHz/1800 MHz/2 GHz three frequency bands composed of a GSM900/DCS1800 dual-band single-mode antenna system and a WCDMA antenna system can be realized without making drastic modifications.

Furthermore, the antenna device is characterized in that the first antenna is further matching with a fourth frequency band; the diplexer distributes signals into signals of the first frequency band and signals of the second, third, and fourth frequency bands; and the second switch unit selects a second receiver for receiving signals of the second frequency band, a fourth receiver for receiving signals of the fourth frequency band, or a fourth transmitter for transmitting signals of the second or fourth frequency band and connecting the same to the diplexer.

According to the above-described construction, an antenna device which corresponds to two radio communications systems and four frequency bands, which can simultaneously carry out a reception and a transmission of different radio communications systems, and which is capable of using antenna diversity can be provided by a simple construction. Namely, two antenna systems corresponding to the four frequency bands composed of a tri-band single-mode antenna system of the first, second, and fourth frequency bands and a single-mode antenna system of the third frequency band can be realized without making drastic modifications. In addition, a reception of signals of the first frequency band and a transmission of signals of the third frequency band can be simultaneously carried out. Furthermore, for signals of the third frequency band, an antenna device capable of using antenna diversity can be simply provided.

In addition, the antenna device is characterized in being provided with an antenna switching connector which is provided between the first antenna matched with the first to fourth frequency bands and diplexer and which connects, when an external antenna is attached, the external antenna to the diplexer in place of the first antenna.

According to the above-described construction, a dual-mode/multi-band antenna device corresponding to the fourth frequency bands which can use an external antenna in place of the first antenna can be provided.

In addition, the antenna device is characterized in being provided with a lowpass filter at least either between the first switch unit and first transmitter or between the second switch unit and fourth transmitter.

According to the above-described construction, a dual-mode/multi-band antenna device corresponding to the four frequency bands which can transmit transmitting waves of transmitting signals whose higher harmonic components have been reduced can be provided.

In addition, the antenna device is characterized in that signals of the first frequency band are signals of a 900 MHz band in a GSM scheme; signals of the second frequency band are signals of a 1800 MHz band in a DCS scheme; signals of the third frequency band are signals of a 2 GHz band in a WCDMA scheme; and signals of the fourth frequency band are signals of a 1900 MHz band in a PCS scheme According to the above-described construction, two antenna systems corresponding to the 900 MHz/1800 MHz/1900 MHz/2 GHz four frequency bands composed of a GSM900/DCS1800/PCS1900 tri-band single-mode antenna system and a WCDMA antenna system can be realized without making drastic modifications.

In addition, the antenna device is characterized in being provided with a controller for switching, if detecting that the external antenna has been attached to the antenna switching connector, the third switch unit so as to connect the transmitter/receiver to the diplexer, and signals of the third frequency band are transmitted and received by the external antenna.

According to the above-described construction, a reception of signals of the first frequency band and a transmission of signals of the third frequency band can be simultaneously carried out. In addition, for signals of the third frequency band, antenna diversity can be used. Furthermore, a dual-mode/multi-band antenna device which allows using only an external antenna without using the first antenna and second antenna can be simply provided.

Figure 1:
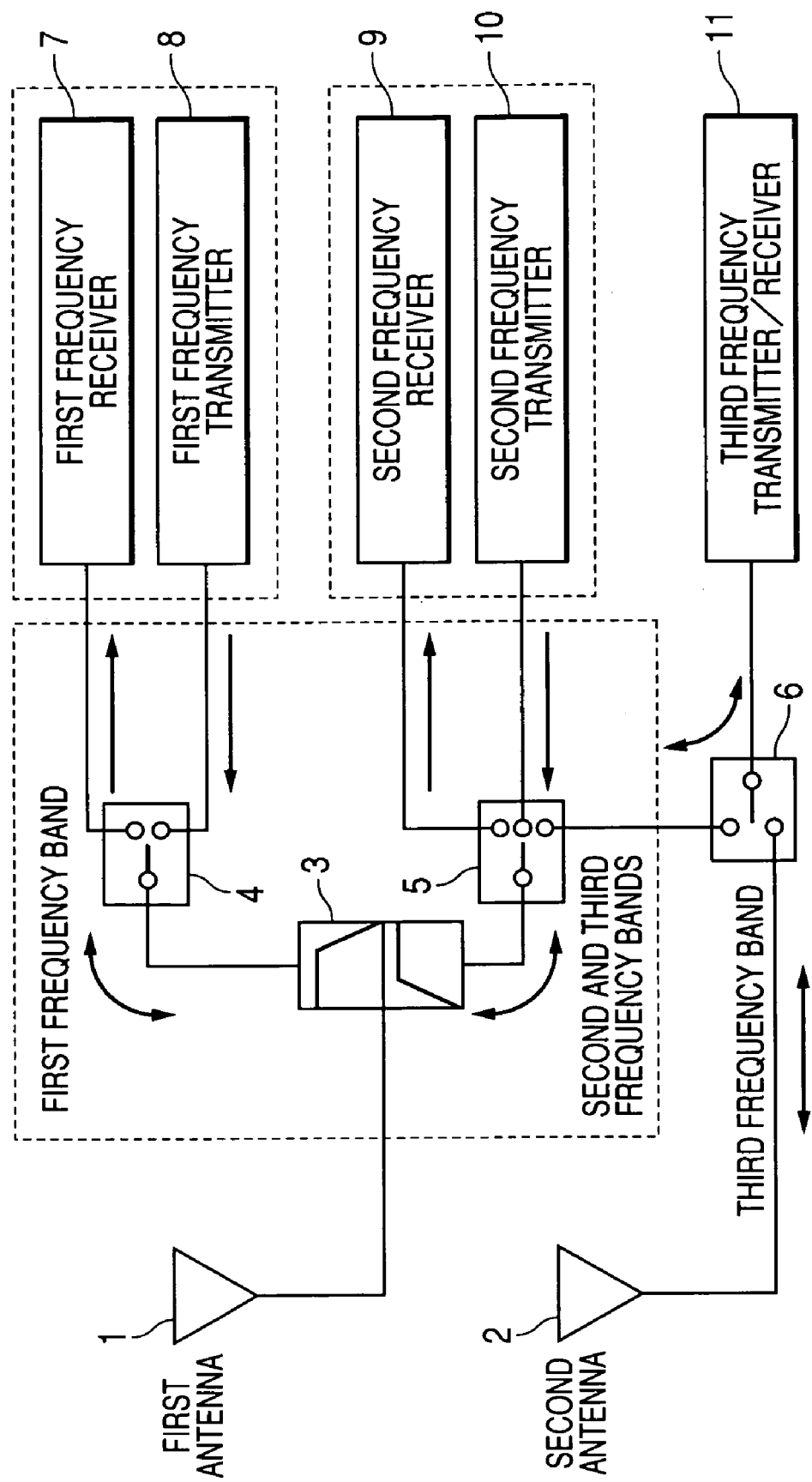
FIG. 1 is a block diagram showing a construction of radio communications equipment to which an antenna device of a first embodiment of the present invention has been applied.

Here, of the numeral references in the drawings, 1 and 20 denote a first antenna, 2 denotes a second antenna, 3 and 21 denote a diplexer, 4 denotes a first high frequency switch circuit, 5 and 22 denote a second high frequency switch circuit, 6 denotes a third high frequency switch circuit, 7 denotes a first frequency receiver, 8 denotes a first frequency transmitter, 9 denotes a second frequency receiver, 10 denotes a second frequency transmitter, 11 denotes a third frequency transmitter/receiver, 12 and 28 denote an antenna switching connector, 13, 14, and 25 denote a lowpass filter, 15 denotes a GSM900 receiver, 16 denotes a GSM900 transmitter, 17 denotes a DCS1800 receiver, 18 denotes a DCS1800 transmitter, 19 denotes a WCDMA transmitter/receiver, 23 denotes a fourth frequency receiver, 24 denotes a second/fourth frequency transmitter, 26 denotes a PCS1900 receiver, 27 denotes DCS1800/PC 1900 receiver, and 30 denotes a control portion.

BEST MODE FOR CARRYING OUT THE INVENTION

Hereinafter, embodiments of the present invention will be described with reference to the drawings.

An antenna device of the present invention is applied to radio communications equipment such as a mobile terminal apparatus of mobile communications systems.

(First Embodiment)

FIG. 1 is a diagram showing a construction of radio communications equipment to which an antenna device of a first embodiment has been applied. This radio communications equipment includes a first antenna 1, a second antenna 2, a diplexer 3, a first high-frequency switch circuit 4, a second high-frequency switch circuit 5, a third high-frequency switch circuit 6, a first frequency receiver 7, a first frequency transmitter 8, a second frequency receiver 9, a second frequency transmitter 10, and a third frequency transmitter/receiver 11. The antenna device of the first embodiment is constructed by including the first antenna 1, second antenna 2, diplexer 3, first high-frequency switch circuit 4, second high-frequency switch circuit 5, and third high-frequency switch circuit 6, The first antenna 1 is matched with first, second, and third frequency bands. The second antenna 2 is matched with the third frequency band. The diplexer 3 distributes signals from the first antenna 1 to signals of the first frequency band and signals of the second and third frequency bands.

The first high-frequency switch circuit 4 (equivalent to a first switch unit described in CLAIMS) is for switching connection between the first frequency receiver 7 or first frequency transmitter 8 and diplexer 3, and when the diplexer 3 is connected to the first frequency receiver 7, signals of the first frequency band from the diplexer 3 are transmitted to the receiver 7, and when the diplexer 3 is connected to the first frequency transmitter 8, signals of the first frequency band from the transmitter 8 are transmitted to the diplexer 3.

The second high-frequency switch circuit 5 (including a second switch unit and a part of a third switch unit described in CLAIMS) is for switching connection between the second frequency receiver 9, second frequency transmitter 10, or third high-frequency switch circuit 6 and diplexer 3, and when the diplexer 3 is connected to the second frequency receiver 9, signals of the second and third frequency bands from the diplexer 3 are transmitted to the receiver 9, and when the diplexer 3 is connected to the second frequency transmitter 10, signals of the second frequency band from the transmitter 10 are transmitted to the diplexer 3.

The third high-frequency switch circuit 6 (equivalent to a part of a third switch unit described in CLAIMS) is for switching connection between the second antenna 2 or second high-frequency switch circuit 5 and third frequency transmitter/receiver 11, and when the third frequency transmitter/receiver 11 is connected to the second antenna 2, signals of the third frequency band transmitted and received between the third frequency transmitter/receiver 11 and second antenna 2 are transmitted. In addition, when the diplexer 3 is connected to the third frequency transmitter/receiver 11 by the second high-frequency switch circuit 5 and third high-frequency switch circuit 6, signals of the third frequency band are transmitted between the first antenna 1 and third frequency transmitter/receiver 11.

Here, the first, second, and third high-frequency switch circuits are controlled in terms of their switching operations by an unillustrated control portion, and are switched according to the appropriate antenna, frequency, and discrimination of transmission/reception. The same applies to the following embodiments.

As such, the antenna device of the first embodiment constructs, by using the second high-frequency switch circuit 5 and third high-frequency switch circuit 6, a dual-band single-mode antenna system in the first and second frequency bands and a single mode antenna system in the third frequency band.

Operations of the antenna device having the above-described construction will be shown. In a case where signals of the first frequency band are received by the first antenna 1, high-frequency signals are filtered by the diplexer 3, and signals of the first frequency band reach the first frequency switch circuit 4. When the first frequency receiver 7 is connected to the diplexer 3 by the first high-frequency switch circuit 4, the signals of the first frequency band are transmitted to the first frequency receiver 7. On the other hand, in a case where signals of the first frequency band are transmitted from the first frequency transmitter 8, the diplexer 3 and first frequency transmitter 8 are connected by the first high-frequency switch circuit 4, and during a transmission, signals of the first frequency band are radiated from the first antenna 1 via the diplexer 3.

In addition, in a case where signals of the second frequency band are received by the first antenna 1, the signals are filtered into high-frequency signals including signals of the second and third frequency bands by the diplexer 3 and reach the second high-frequency switch circuit 5. When the second frequency receiver 9 is connected to the diplexer 3 by the second high-frequency switch circuit 5, signals of the second frequency band are transmitted to the second frequency receiver 9. On the other hand, in a case where signals of the second frequency band are transmitted from the second frequency transmitter 10, the diplexer 3 and second frequency transmitter 10 are connected by the second high-frequency switch circuit 5, and during a transmission, signals of the second frequency band are radiated from the first antenna 1 via the diplexer 3.

In addition, in a case where signals of the third frequency band are transmitted and received, transmission and reception are possible by selecting either the first antenna 1 or second antenna 2. In the case where signals of the third frequency band are transmitted and received, the diplexer 3 is connected to the third high-frequency switch circuit 6 by the second high-frequency switch circuit 5, and furthermore, when the second high-frequency switch circuit 5 and third frequency transmitter/receiver 11 are connected by the third high-frequency switch circuit 6, signals of the third frequency band are transmitted between the first antenna 1 and third frequency transmitter/receiver 11. Accordingly, signals received by the first antenna 1 are filtered into high-frequency signals including signals of the second and third frequency bands by the diplexer 3, reach the second high-frequency switch circuit 5, and are transmitted to the third frequency transmitter/receiver 11.

On the other hand, in a case where signals of the third frequency band are transmitted and received by the second antenna 2, the second antenna 2 and third frequency transmitter/receiver 11 are connected by the third high-frequency switch circuit 6, and the signals of the third frequency band are transmitted between the second antenna 2 and third frequency transmitter/receiver 11.

As such, in a case where signals of the third frequency band are transmitted and received, antenna diversity for switching appropriate antennas according to transmission and reception efficiencies of the respective antennas is realized.

In addition, in a case where a reception of signals of the first frequency band and a transmission of signals of the third frequency band are simultaneously carried out, this can be realized by two methods. One thereof is a method of transmitting signals of the third frequency band by the second antenna 2 and receiving signals of the first frequency band by the first antenna 1. The other is a method of transmitting signals of the third frequency band and receiving signals of the first frequency band by only the first antenna 1.

As such, according to the antenna device of the first embodiment, two antenna systems corresponding to three frequency bands composed of a dual-band single-mode antenna system of the first and second frequency bands and a single-mode antenna system of the third frequency band can be realized without making drastic modifications to a conventional device. Moreover, a reception of signals of the first frequency band and a transmission of signals of the third frequency band can be simultaneously carried out. In addition, for signals of the third frequency band, a dual-mode/multi-band antenna device capable of realizing an antenna diversity function can be simply provided.

(Second Embodiment)

Figure 2:
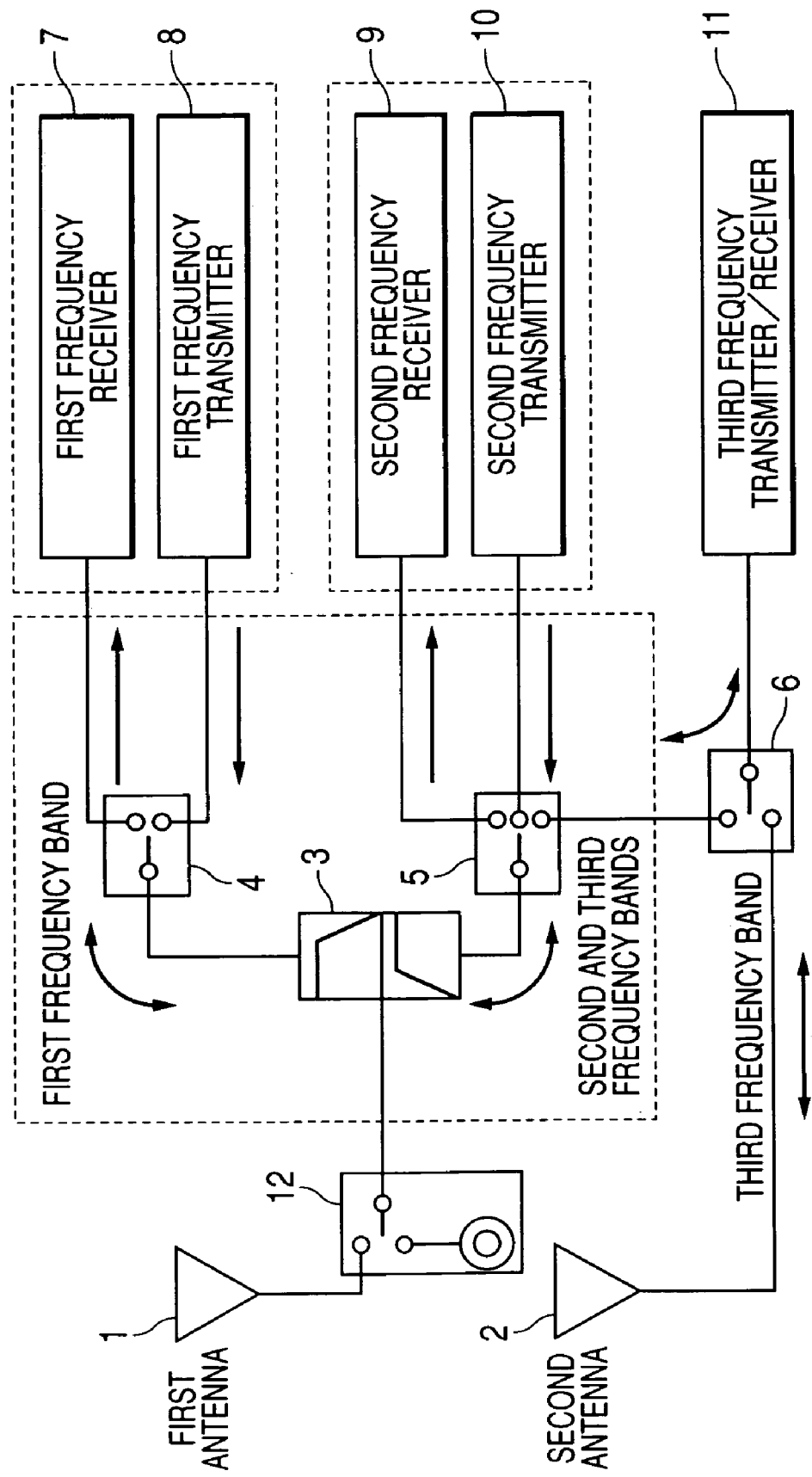
FIG. 2 is a block diagram showing a construction of radio communications equipment to which an antenna device of a second embodiment of the present invention has been applied.

FIG. 2 is a diagram showing a construction of radio communications equipment to which an antenna device of a second embodiment has been applied. Since the antenna device of the second embodiment has almost the same construction as that of the first embodiment, identical symbols to those of the first embodiment are used for identical component parts, whereby description thereof will be omitted, and herein description will be given of only different component parts.

Namely, the antenna device of the second embodiment has an antenna switching connector 12, and the construction and operations except for this antenna switching connector are the same as those of the first embodiment. To the antenna switching connector 12, a cable plug (unillustrated) connected to an external antenna is freely attached, and the antenna connector 12 switches connection so as to connect, when this cable plug is attached, the external antenna and a diplexer 3 and, when no cable plug is attached, a first antenna 1 and the diplexer 3.

In this antenna device, signals of a first frequency band received by the first antenna 1 are received by a first frequency receiver 7, and signals of the first frequency band are transmitted from a first frequency transmitter 8. In addition, signals of a second frequency band are received by a second frequency receiver 9, and signals of the second frequency band are transmitted from a second frequency transmitter 10. Furthermore, in a case where a third high-frequency switch circuit 6 has selected a second high-frequency switch circuit 5, namely in a case where the third high-frequency switch circuit 6 has selected the first antenna 1, signals of a third frequency band from a third frequency transmitter/receiver 11 can be communicated by the first antenna 1 or an external antenna attached to the antenna switching connector 12.

As such, according to the antenna device of the second embodiment, two antenna systems corresponding to three frequency bands composed of a conventional dual-band single-mode antenna system and a single-mode antenna system of the third frequency band can be realized without making drastic modifications. Moreover, a reception of signals of the first frequency band and a transmission of signals of the third frequency band can be simultaneously carried out. In addition, for the third frequency band, antenna diversity is realized. Furthermore, a dual-mode/multi-band antenna device which can use an external antenna in place of the first antenna 1 can be simply provided.

(Third Embodiment)

Figure 3:
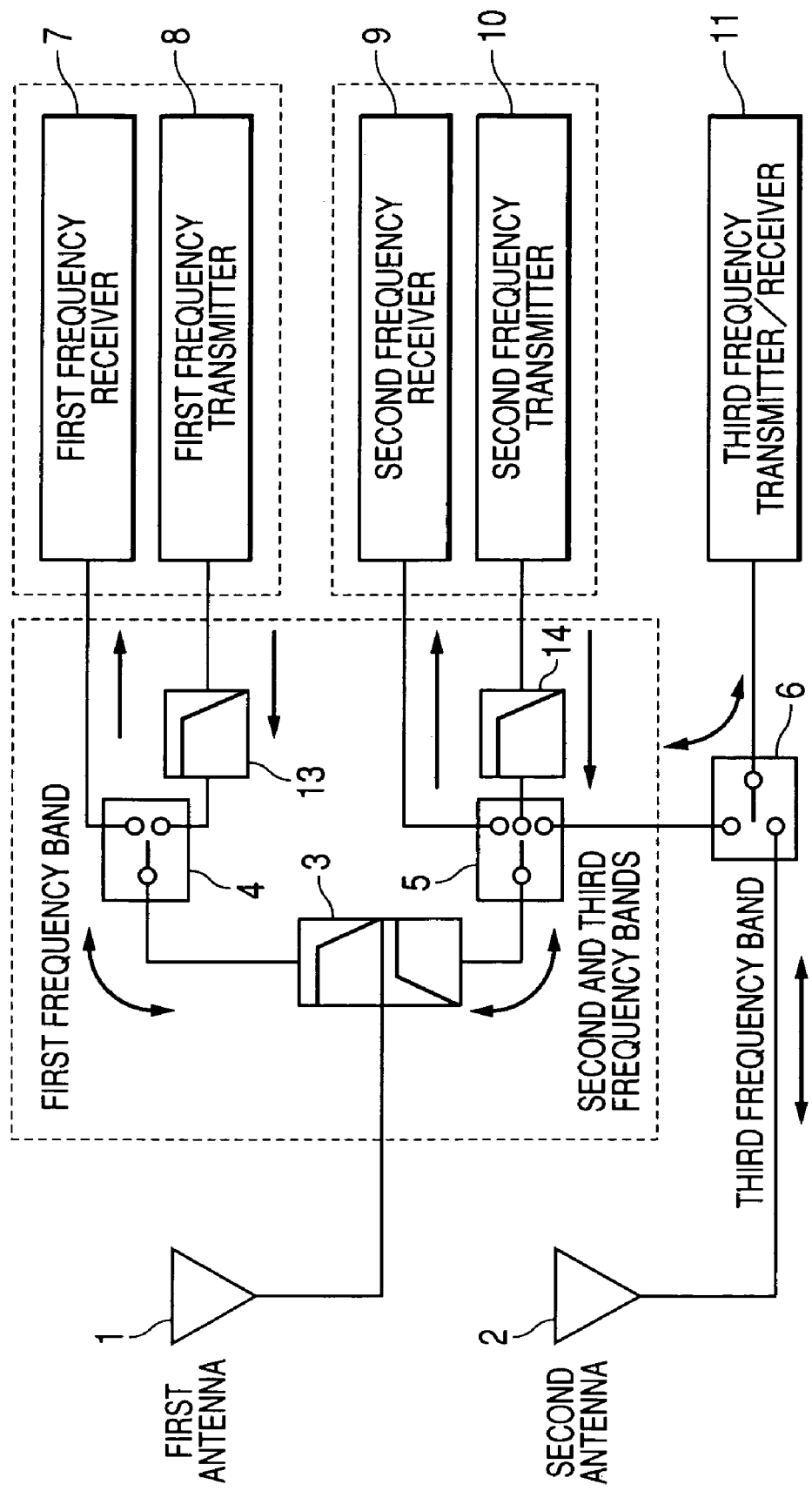
FIG. 3 is a block diagram showing a construction of radio communications equipment to which an antenna device of a third embodiment of the present invention has been applied.

FIG. 3 is a diagram showing a construction of radio communications equipment to which an antenna device of a third embodiment has been applied. The antenna device of the third embodiment is, in addition to having the same construction as that of the first embodiment, provided with, at an output side of a first frequency transmitter 8 for transmitting signals of a first frequency band and at an output side of a second frequency transmitter 10 for transmitting signals of a second frequency band, lowpass filters 13 and 14 to suppress their respective higher harmonics. The construction and operations except for these lowpass filters 13 and 14 are the same as those of the first embodiment.

Namely, since output signals of the first frequency transmitter 8 and output signals of the second frequency transmitter 10 and transmitted from the first antenna while respective higher harmonic components thereof are suppressed, for transmitting signals of the first frequency band and second frequency band, an antenna device for transmitting signals whose higher harmonic components have been reduced can be provided.

As such, according to the third embodiment, two antenna systems corresponding to three frequency bands composed of a conventional dual-band single-mode antenna system and a single-mode antenna system of a third frequency band can be realized without making drastic modifications. Moreover, a reception of signals of the first frequency band and a transmission of signals of the third frequency band can be simultaneously carried out. Furthermore, for the third frequency band, antenna diversity is realized. In addition, for the first frequency band and second frequency band, a dual-mode/multi-band antenna device which can transmit signals whose higher harmonics have been reduced can be simply provided.

Here, similar to the second embodiment, in the antenna device of the third embodiment as well, an antenna switching connector may be provided. In addition, either only one of the lowpass filters 13 and 14 may be provided.

(Fourth Embodiment)

Figure 4:
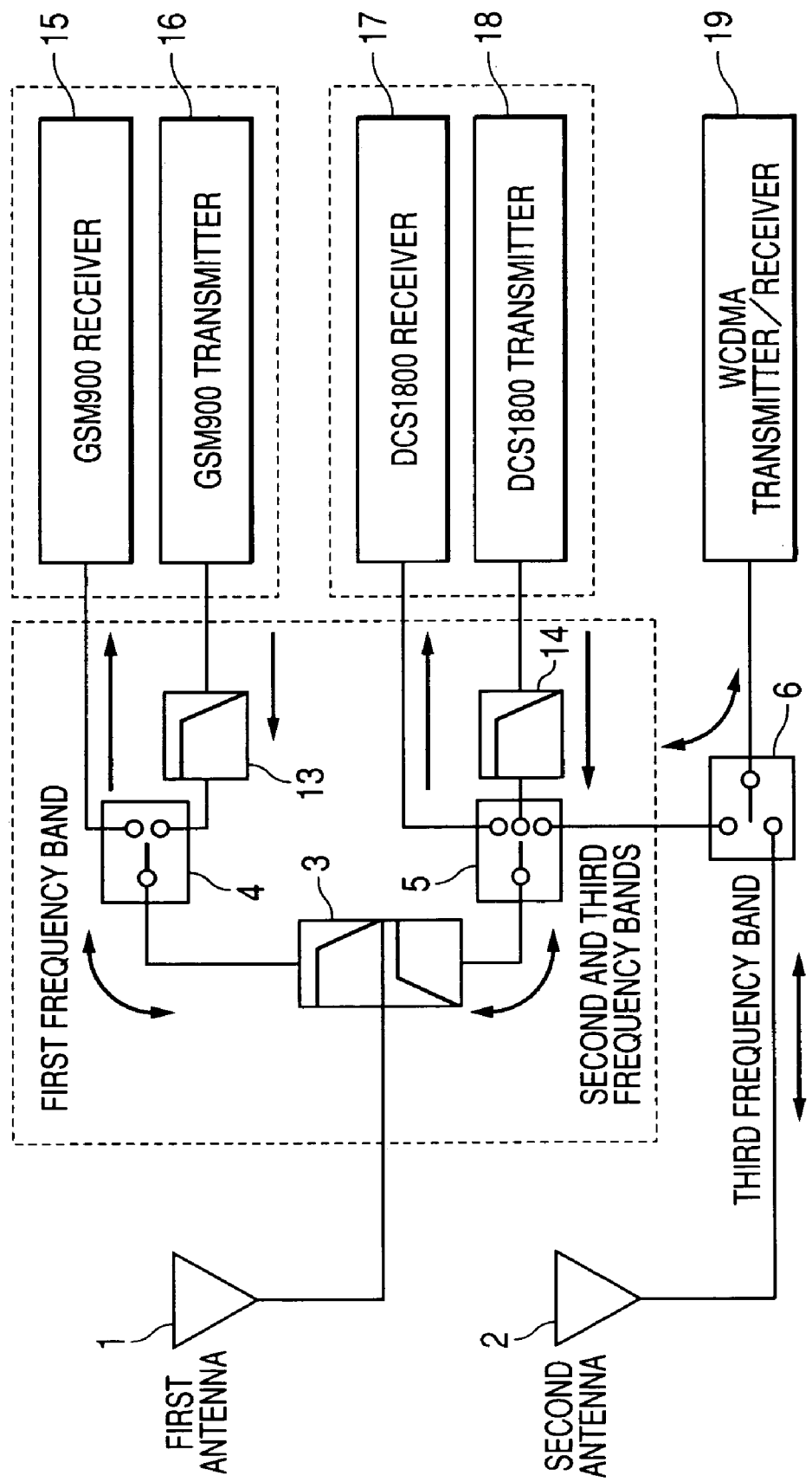
FIG. 4 is a block diagram showing a construction of radio communications equipment to which an antenna device of a fourth embodiment of the present invention has been applied.

FIG. 4 is a diagram showing a construction of radio communications equipment to which an antenna device of a fourth embodiment has been applied. The antenna device of the fourth embodiment has the same construction as that of the third embodiment. Concretely, the antenna device includes a GSM900 receiver 15 as a first frequency receiver for processing received signals of a first frequency band (900 MHz signals in the GSM scheme), a GSM900 transmitter 16 as a first frequency transmitter for generating transmitting signals of the first frequency band, a DCS1800 receiver 17 as a receiver for processing received signals of a second frequency band (1800 MHz signals in the DCS scheme), a DCS1800 transmitter 18 as a transmitter for generating transmitting signals of the second frequency band, and a WCDMA transmitter/receiver 19 as a transmitter/receiver for generating and processing signals of a third frequency band (2 GHz signals in the WCDMA scheme). Herein, GSM stands for global system for mobile communications. DCS stands for digital cellular system. WCDMA stands for wideband code division multiple access.

Transmitting and receiving operations of the antenna device having the above-described construction will be shown. GSM900 received signals which are received waves of the first frequency band are received by a first antenna 1, and, after a higher harmonic component is filtered by a diplexer 3, the signals reach a first high-frequency switch circuit 4. The first high-frequency switch circuit 4 selects the GSM900 receiver 15 when receiving GSM900 signals, which are received waves of the first frequency band.

In addition, GSM900 transmitting signals which are transmitting waves of the first frequency band are transmitted from the GSM900 transmitter 16, and, after a higher harmonic component is reduced by a lowpass filter 13, during a transmission, the signals are radiated from the first antenna 1 via the first high-frequency switch circuit 4 and a diplexer 3 connected to the GSM900 transmitter 16.

DCS1800 received signals which are received waves of the second frequency band are received by the first antenna 1 and, as high-frequency signals including signals of the second and third frequency bands by the diplexer 3, the signals reach a second high-frequency switch circuit 5. The second high-frequency switch circuit 5 selects the DCS1800 receiver 17 when receiving DCS1800 signals of the second frequency band.

In addition, DCS1800 transmitting signals which are transmitting waves of the second frequency band are transmitted from the DCS1800 transmitter 18, and, after a higher harmonic component is reduced by a lowpass filter 14, during a transmission, the signals are radiated from the first antenna 1 via the second high-frequency switch circuit 5 and diplexer 3 connected to the DCS1800 transmitter 18 side.

WCBMA signals which are transmitting and receiving waves of the third frequency band can be transmitted and received by selecting either the first antenna 1 or second antenna 2. Signals transmitted and received by the first antenna 1 reach, as high-frequency signals including signals of the second and third frequency bands by the diplexer 3, the second high-frequency switch circuit 5. The second high-frequency switch circuit 5 is connected, when transmitting and receiving WCDMA signals, to a third high-frequency switch circuit 6, and furthermore, the third high-frequency switch circuit 6 is connected to the second high-frequency switch circuit 5, and transmission and reception by a WCDMA transmitter/receiver 19 become possible.

In addition, when WCDMA signals are transmitted by the second antenna 2, the second antenna 2 is selected by the third high-frequency switch circuit 6, and signals of the WCDMA transmitter/receiver 19 are transmitted and received by the second antenna 2. Namely, for the WCDMA transmitter/receiver 19, antenna diversity for switching connecting antennas according to transmission and reception efficiencies of the respective antennas is realized.

Furthermore, operations in a case where, during communications by the WCDMA scheme, GSM900 is received by using, of compressed mode operations for intersystem monitoring, only a downlink (communication from a base station to a terminal) compressed mode without using an uplink (communication from a terminal to a base station) compressed mode can be realized, in the present embodiment, by two methods. Namely, a method of transmitting WCDMA signals by the second antenna 2 and receiving GSM900 by the first antenna 1, and a method of transmitting WCDMA signals and receiving GSM900 by only the first antenna 1.

As such, according to the antenna device of the fourth embodiment, two antenna systems corresponding to three frequency bands of 900 MHz/1800 MHz/2 GHz frequency bands composed of a conventional GSM900/DCS1800 dual-band single-mode antenna system and a WCDMA single-mode antenna system can be realized without making drastic modifications.

Moreover, GSM900 can be received by using, of compressed mode operations for intersystem monitoring during communications by the WCDMA scheme, only a downlink compressed mode without using an uplink compressed mode. Furthermore, for the WCDMA scheme, a dual-mode/multi-band antenna device capable of realizing antenna diversity can be simply provided.

Here, in the antenna device of the fourth embodiment as well, the antenna switching connector of the second embodiment may be used. Furthermore, if it is possible to satisfy standards for the radio equipment with an antenna output without the lowpass filters 13 and 14, these may not be provided.

(Fifth Embodiment)

Figure 5:
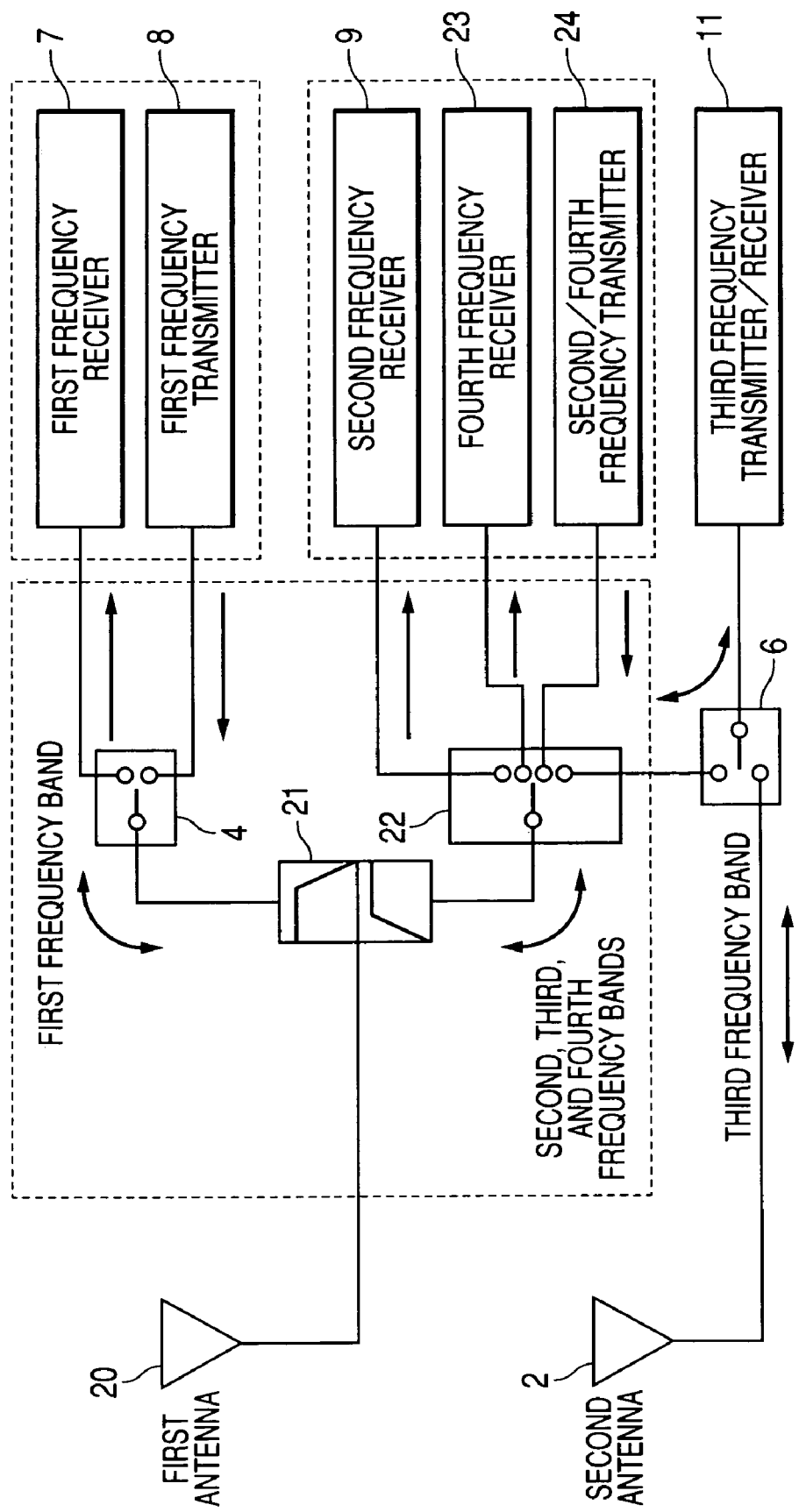
FIG. 5 is a block diagram showing a construction of radio communications equipment to which an antenna device of a fifth embodiment of the present invention has been applied.

FIG. 5 is a diagram showing a construction of radio communications equipment to which an antenna device of a fifth embodiment has been applied. Identical symbols are used for component parts identical to those of the first embodiment. This radio communications equipment includes a first antenna 20, a second antenna 2, a diplexer 21, a first high-frequency switch circuit 4, a second high-frequency switch circuit 22, a third high-frequency switch circuit 6, a first frequency receiver 7, a first frequency transmitter 8, a second frequency receiver 9, a fourth frequency receiver 23, a second/fourth frequency transmitter 24, and a third frequency transmitter/receiver 11. The antenna device of the fifth embodiment is constructed while including the first antenna 20, second antenna 2, diplexer 21, first high-frequency switch circuit 4, second high-frequency switch circuit 22, and third high-frequency switch circuit 6.

The first antenna 20 is matched with first, second, third, and fourth frequency bands. The diplexer 21 distributes signals from the first antenna 20 to signals of the first frequency band and signals of the second, third, and fourth frequency bands.

The first high-frequency switch circuit 4 is for switching connection between the first frequency receiver 7 or first frequency transmitter 8 and diplexer 21, and when the diplexer 21 is connected to the first frequency receiver 7, signals of the first frequency band from the diplexer 21 are transmitted to the receiver 7, and when the diplexer 21 is connected to the first frequency transmitter 8, transmitting signals of the first frequency band from the transmitter 8 are transmitted to the diplexer 21.

The second high-frequency switch circuit 22 is for switching connection between the second frequency receiver 9, fourth frequency receiver 23, second/fourth frequency transmitter 24, or third high-frequency switch circuit 6 and diplexer 21, and when the diplexer 21 is connected to the second frequency receiver 9, signals of the second, third, and fourth frequency bands from the diplexer 21 are transmitted to the second frequency receiver 9, and when the diplexer 21 is connected to the fourth frequency receiver 23, signals of the second, third, and fourth frequency bands from the diplexer 21 are transmitted to the fourth frequency receiver 23, and when the diplexer 21 is connected to the second/fourth frequency transmitter 24, signals of the second or fourth frequency band from the second/fourth frequency transmitter 24 are transmitted to the diplexer 21.

The third high-frequency switch circuit 6 is for switching connection between the second antenna 2 or second high-frequency switch circuit 22 and third frequency transmitter/receiver 11, and when the third frequency transmitter/receiver 11 is connected to the second antenna 2, signals of the third frequency band transmitted and received between the third frequency transmitter/receiver 11 and second antenna 2 are transmitted. In addition, when the diplexer 21 is connected to the third frequency transmitter/receiver 11 by the second high-frequency switch circuit 22 and third high-frequency switch circuit 6, signals of the third frequency band are transmitted between the first antenna 20 and third frequency transmitter/receiver 11.

As such, the antenna device of the fifth embodiment realizes, by using the second high-frequency switch circuit 22 and third high-frequency switch circuit 6, a tri-band single-mode antenna system in the first, second, and fourth frequency bands and a single mode antenna system in the third frequency band.

Operations of the antenna device having the above-described construction will be shown. Signals of the first frequency band are received by the first antenna 20, after a higher harmonic component is filtered by the diplexer 21, the signals reach the first frequency switch circuit 4. The first high-frequency switch circuit 4 is, when receiving signals of the first frequency band, connected to the first frequency receiver 7. The signals of the first frequency band are transmitted from the first frequency transmitter 8 and are, during a transmission, radiated from the first antenna 20 via the first high-frequency switch circuit 4 and diplexer 21 connected to the first frequency transmitter 8 side.

Signals of the second frequency band are received by the first antenna 20 and, as high-frequency signals including second, third, and fourth frequency components by the diplexer 2, the signals reach the second high-frequency switch circuit 22. The second high-frequency switch circuit 22 is, when receiving signals of the second frequency band, connected to the second frequency receiver 9.

Signals of the fourth frequency band are received by the first antenna 20 and, as high-frequency signals including signals of the second, third, and fourth frequency bands by the diplexer 21, the signals reach the second high-frequency switch circuit 22. The second high-frequency circuit 22 is, when receiving signals of the fourth frequency band, connected to the fourth frequency receiver 23.

In addition, signals of the second and fourth frequency bands are transmitted from the second/fourth frequency transmitter 24 and, during a transmission, the signals are radiated from the first antenna 20 via the diplexer 21 connected to the second/fourth frequency transmitter 24 side by the second high-frequency switch circuit 22.

Signals of the third frequency band can be transmitted and received by selecting either the first antenna 20 or second antenna 2. Signals transmitted and received by the first antenna 20 reach the second high-frequency switch circuit 22 as high-frequency signals including signals of the second, third, and fourth frequency bands by the diplexer 21. The second high-frequency switch circuit 22 is, when transmitting and receiving signals of the third frequency band, connected to the third high-frequency switch circuit 6, and the third high-frequency switch circuit 6 is connected to the second high-frequency switch circuit 22, and the signals of the third frequency band can be transmitted and received by the third frequency transmitter/receiver 11.

In a case where the signals of the third frequency band are transmitted and received, the third high-frequency switch circuit 6 is connected to the second antenna 2. Namely, for signals of the third frequency band, an antenna diversity function for switching connecting antennas according to transmission and reception efficiencies of the respective antennas can be realized.

In addition, in a case where a reception of signals of the first frequency band and a transmission of signals of the third frequency band are simultaneously carried out, this can be realized by two methods. One thereof is a method of transmitting signals of the third frequency band by the second antenna 2 and receiving signals of the first frequency band by the first antenna 20. The other is a method of transmitting signals of the third frequency band and receiving signals of the first frequency band by only the first antenna 20.

According to the antenna device of the fifth embodiment, two antenna systems corresponding to four frequency bands composed of a conventional tri-band single-mode antenna system and a single-mode antenna system of the third frequency band can be realized without making drastic modifications. Moreover, a reception of signals of the first frequency band and a transmission of signals of the third frequency band can be simultaneously carried out. In addition, for signals of the third frequency band, a dual-mode/multi-band antenna device capable of realizing an antenna diversity function can be simply provided.

(Sixth Embodiment)

Figure 6:
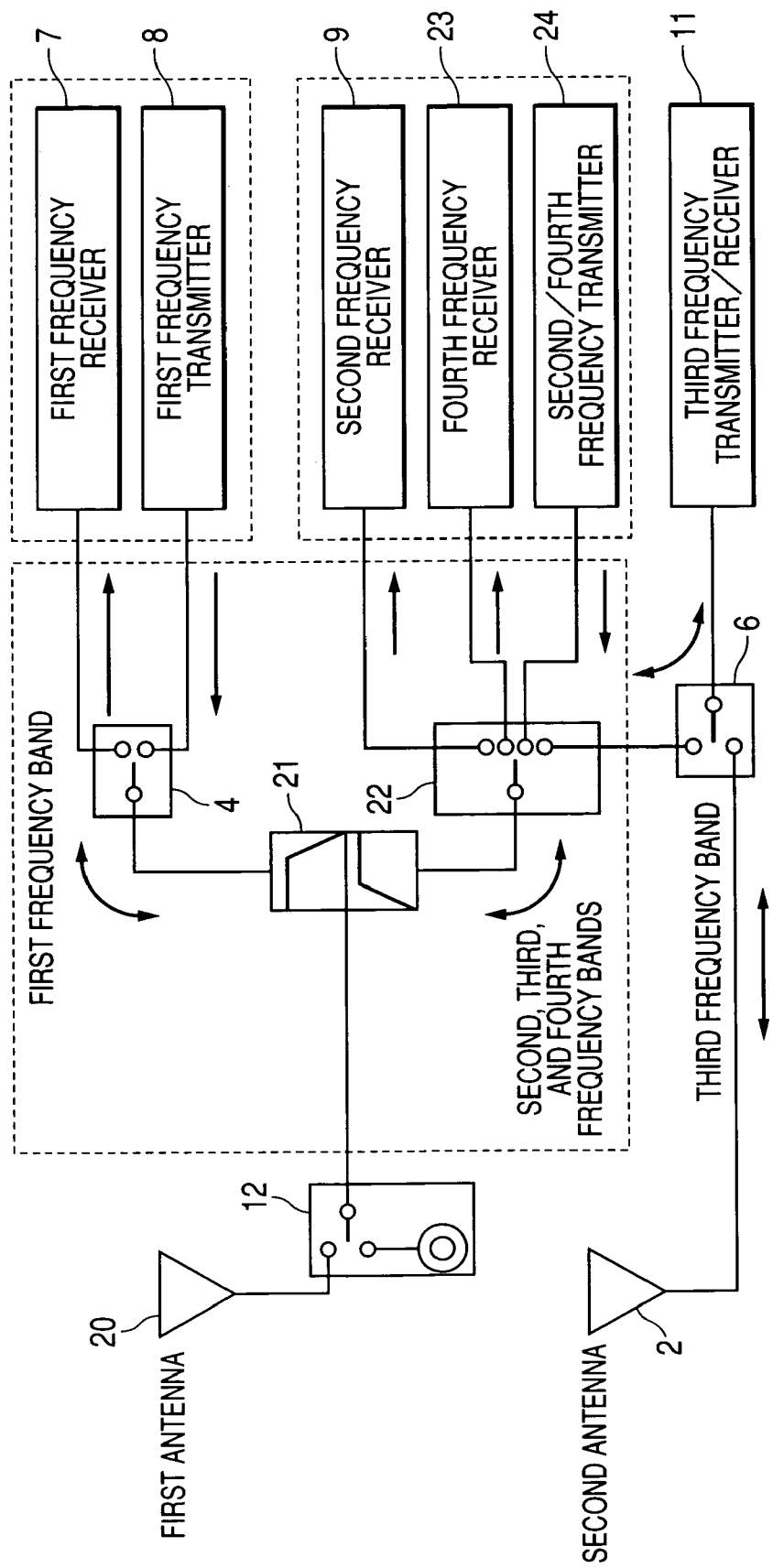
FIG. 6 is a block diagram showing a construction of radio communications equipment to which an antenna device of a sixth embodiment of the present invention has been applied.

FIG. 6 is a diagram showing a construction of radio communications equipment to which an antenna device of the sixth embodiment has been applied. Since the antenna device of the sixth embodiment has almost the same construction as that of the fifth embodiment, identical symbols to those of the fifth embodiment are used for identical component parts, whereby description thereof will be omitted, and herein description will be given of only different component parts.

Namely, the antenna device of the sixth embodiment has an antenna switching connector 12, and the construction and operations except for this antenna switching connector are the same as those of the fifth embodiment. The antenna switching connector 12 is, to which a cable plug (unillustrated) connected to an external antenna is freely attached, for switching connection so as to connect, when this cable plug is attached, the external antenna and a diplexer 3 and, when no cable plug is attached, a first antenna 1 and the diplexer 3.

In this antenna device, signals of a first frequency band transmitted and received by the first antenna 20 are received by a first frequency receiver 7, signals of the first frequency band are transmitted from a first frequency transmitter 8, signals of a second frequency band are received by a second frequency receiver 9, signals of a fourth frequency band are received by a fourth frequency receiver 23, and when signals of the second/fourth frequency band are transmitted from a second/fourth frequency transmitter 24, a third high-frequency switch circuit 6 selects a second high-frequency switch circuit 22 side. Namely, in a case where the third high-frequency switch circuit 6 has selected the first antenna side, signals of a third frequency band from the third frequency transmitter/receiver 11 can be communicated by the first antenna 1 or an external antenna attached to the antenna switching connector 12.

As such, according to the antenna device of the sixth embodiment, two antenna systems corresponding to four frequency bands composed of a conventional tri-band single-mode antenna system and a single-mode antenna system of the third frequency band can be realized without making drastic modifications. Moreover, a reception of signals of the first frequency band and a transmission of signals of the third frequency band can be simultaneously carried out. Furthermore, for the third frequency band, antenna diversity can be used, and in this case, a dual-mode/multi-band antenna device which can also use an external antenna in place of the first antenna 20 can be simply provided.

(Seventh Embodiment)

Figure 7:
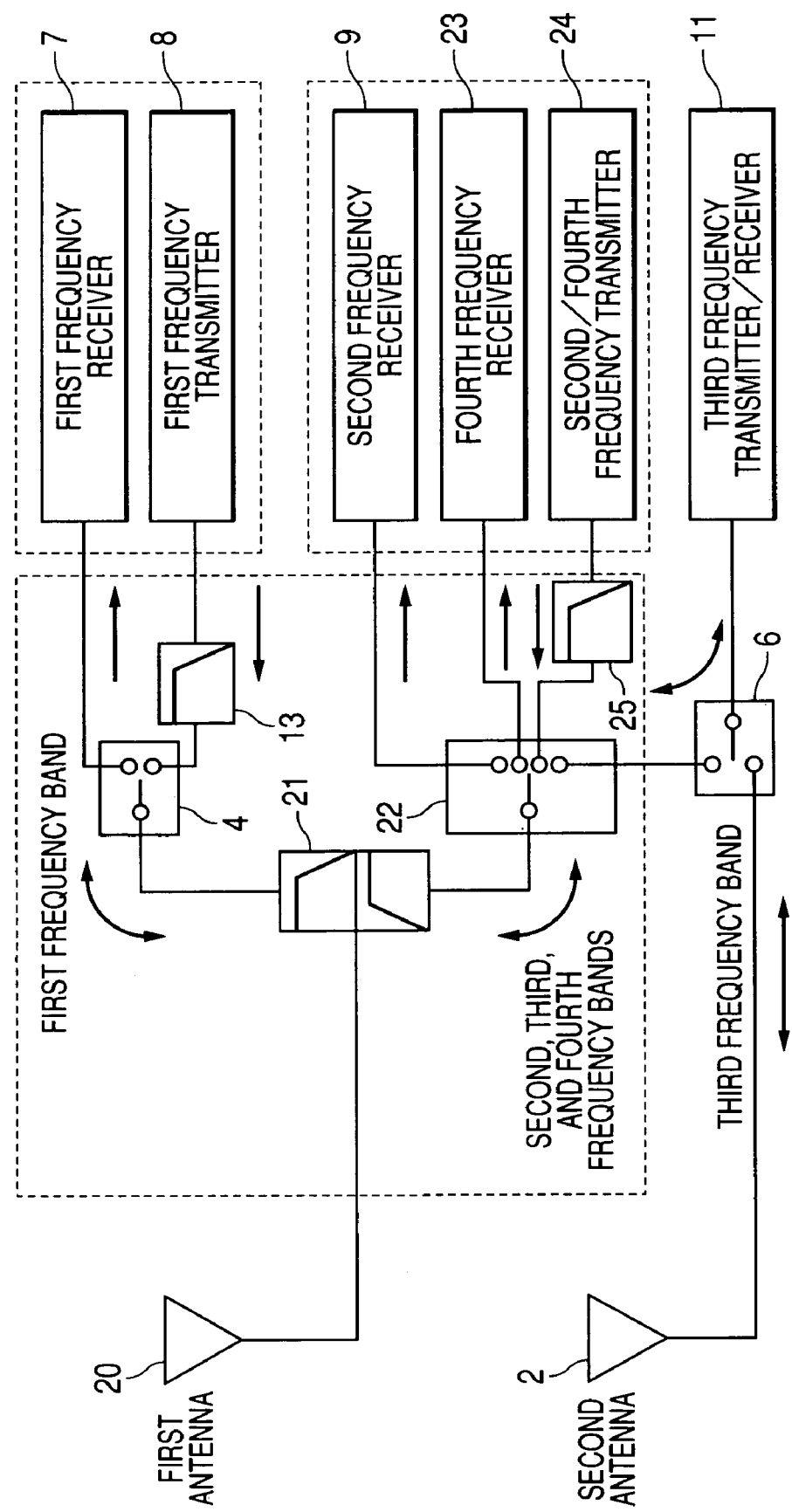
FIG. 7 is a block diagram showing a construction of radio communications equipment to which an antenna device of a seventh embodiment of the present invention has been applied.

FIG. 7 is a diagram showing a construction of radio communications equipment to which an antenna device of a seventh embodiment has been applied. The antenna device of the seventh embodiment is, in addition to having the same construction as that of the fifth embodiment, provided with, at an output side of a first frequency transmitter 24 for transmitting signals of a first frequency band and at an output side of a second/fourth frequency transmitter 8 for transmitting signals of the second/fourth frequency band, lowpass filters 13 and 25 to suppress their respective higher harmonics. The construction and operations except for these lowpass filters 13 and 25 are the same as those of the fifth embodiment.

Namely, since output signals of the first frequency transmitter 8 and output signals of the second/fourth frequency transmitter 24 and transmitted from the first antenna 20 while respective higher harmonic components thereof are suppressed, for the first frequency band and second frequency band, an antenna device for transmitting signals whose higher harmonic components have been reduced can be provided.

As such, according to the seventh embodiment, two antenna systems corresponding to four frequency bands comprised of a conventional tri-band single-mode antenna system and a single-mode antenna system of the third frequency band can be realized without making drastic modifications. Moreover, a reception of signals of the first frequency band and a transmission of signals of the third frequency band can be simultaneously carried out. In addition, for a third frequency band, antenna diversity can be used. In addition, for the first frequency band and second/fourth frequency band, an antenna device for transmitting signals whose higher harmonic components have been reduced can be simply provided.

Here, similar to the sixth embodiment, in the antenna device of the seventh embodiment as well, an antenna switching connector may be provided. In addition, either only one of the lowpass filters 13 and 14 may be provided.

(Eighth Embodiment)

Figure 8:
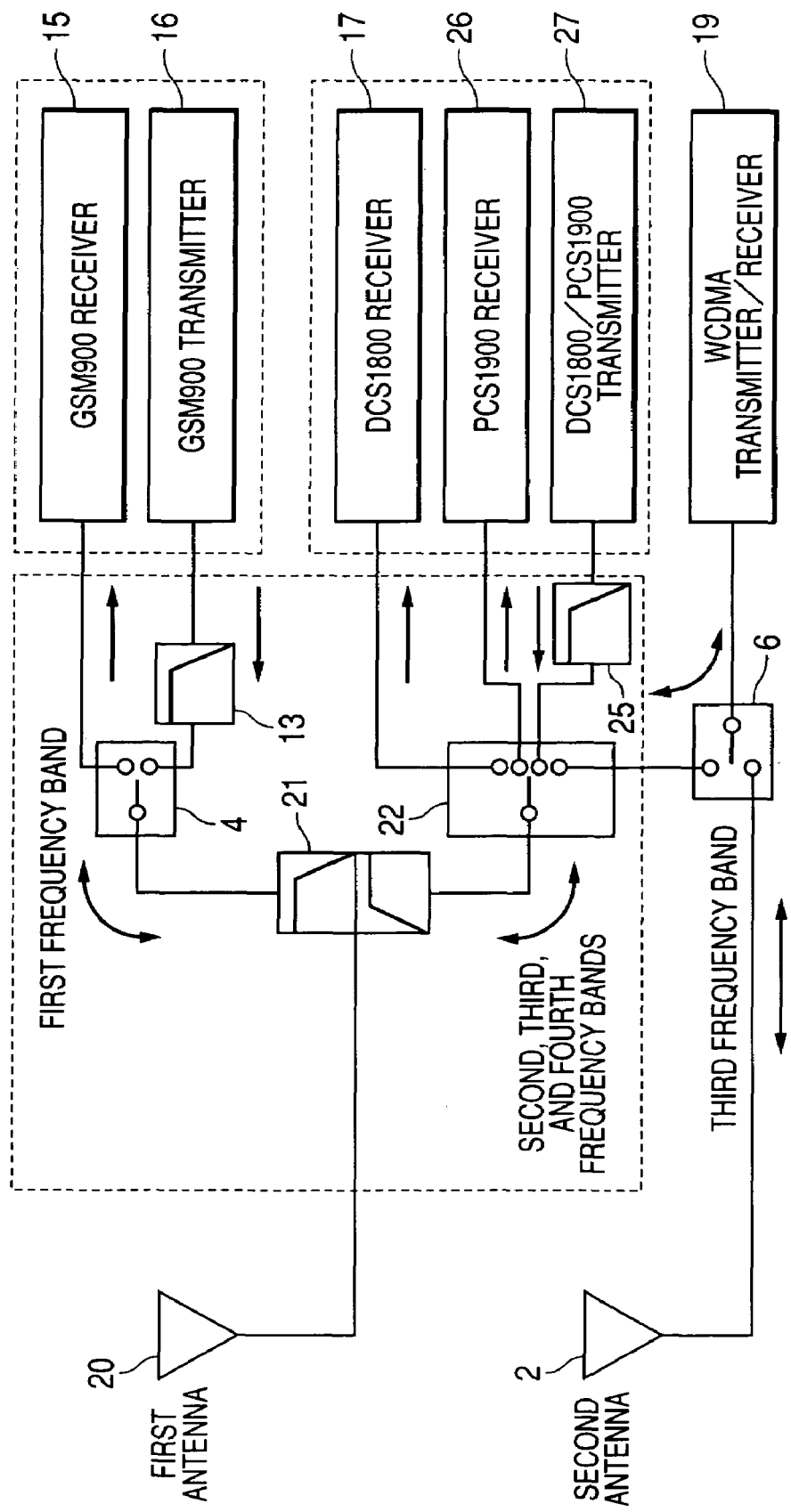
FIG. 8 is a block diagram showing a construction of radio communications equipment to which an antenna device of an eighth embodiment of the present invention has been applied.

FIG. 8 is a diagram showing a construction of radio communications equipment to which an antenna device of an eighth embodiment has been applied. The radio communications equipment of the eighth embodiment has the same construction as that of the seventh embodiment. Concretely, the radio communications equipment includes a GSM900 receiver 15 as a first frequency receiver for processing received signals of a first frequency band (900 MHz signals in the GSM scheme), a GSM900 transmitter 16 as a first frequency transmitter for generating transmitting signals of the first frequency band, a DCS1800 receiver 17 as a receiver for processing received signals of a second frequency band (1800 MHz signals in the DCS scheme), a PCS1900 receiver 26 as a receiver for processing received signals of a fourth frequency band (1900 MHz signals in the PCS scheme), a DCS1800/PCS1900 transmitter 27 as a transmitter for generating transmitting signals of the second/fourth frequency band, and a WCDMA transmitter/receiver 19 as a transmitter/receiver for generating and processing signals of a third frequency band (2 GHz signals in the WCDMA scheme). Herein, PCS stands for personal communications service.

Operations of the radio communications equipment having the above-described construction will be shown. GSM900 received signals which are received waves of the first frequency band are received by a first antenna 20, and, after a higher harmonic component is filtered by a diplexer 13, the signals reach a first high-frequency switch circuit 4. The first high-frequency switch circuit 4 is, when receiving GSM900 signals of the first frequency band, connected to the GSM900 receiver 15.

GSM900 transmitting signals which are transmitting waves of the first frequency band are transmitted from the GSM900 transmitter 16, and, after a higher harmonic component is reduced by a lowpass filter 13, during a transmission, the signals are radiated from the first antenna 20 via the first high-frequency switch circuit 4 and diplexer 21 connected to the GSM900 transmitter 16.

DCS1800 received signals which are received waves of the second frequency band are received by the first antenna 20 and, as high-frequency signals including signals of the second, third, and fourth frequency bands by the diplexer 21, the signals reach a second high-frequency switch circuit 22. The second high-frequency switch circuit 22 is connected to a DCS1800 receiver 17 when receiving DCS1800 signals of the second frequency band.

PCS1900 received signals which are received waves of the fourth frequency band are received by the first antenna 20 and, as high-frequency signals including signals of the second, third, and fourth frequency bands by the diplexer 21, the signals reach a second high-frequency switch circuit 22. The second high-frequency switch circuit 22 is connected to a PCS1900 receiver 16 when receiving PCS1900 signals of the fourth frequency band.

DCS1800 and PCS1900 transmitting signals which are transmitting waves of the second and third frequency bands are transmitted from the DCS1800/PCS1900 transmitter 27, and, after a higher harmonic component is reduced by a lowpass filter 25, during a transmission, the signals are radiated from the first antenna 20 via the second high-frequency switch circuit 22 and diplexer 21 connected to the DCS1800/PCS1900 transmitter 27 side.

WCDMA signals which are transmitting and receiving waves of the third frequency band can be transmitted and received by selecting either the first antenna 20 or second antenna 2. Signals transmitted and received by the first antenna 20 reach, as high-frequency signals including signals of the second, third, and fourth frequency bands by the diplexer 21, the second high-frequency switch circuit 22. The second high-frequency switch circuit 22 is connected, when transmitting and receiving WCDMA signals, to a third high-frequency switch circuit 6, the third high-frequency switch circuit 6 is connected to the second high-frequency switch circuit 22 side, and transmission and reception by a WCDMA transmitter/receiver 19 become possible.

When WCDMA signals are transmitted and received by the second antenna 2, the third high-frequency switch circuit 6 is connected to the second antenna 2, and signals of the WCDMA transmitter/receiver 19 are transmitted and received by the second antenna 2. Namely, for the WCDMA transmitter/receiver 19, antenna diversity for switching connecting antennas according to transmission and reception efficiencies of the respective antennas can be used.

Furthermore, in a case where, during communications by the WCDMA scheme, GSM900 is received by using, of compressed mode operations for intersystem monitoring, only a downlink compressed mode without using an uplink compressed mode, this can be realized, in the present embodiment, by two methods. Namely, a method of transmitting WCDMA signals by the second antenna 2 and receiving GSM900 by the first antenna 20, and a method of transmitting WCDMA signals and receiving GSM900 by only the first antenna 1.

As such, according to the eighth embodiment, two antenna systems corresponding to four frequency bands of 900 MHz/1800 MHz/1900 MHz/2 GHz frequency bands composed of a conventional GSM900/DCS1800/PCS1900 tri-band single-mode antenna system and a WCDMA single-mode antenna system can be realized without making drastic modifications.

Moreover, GSM900 can be received by using, of compressed mode operations for intersystem monitoring during communications by the WCDMA scheme, only a downlink compressed mode without using an uplink compressed mode. Furthermore, for the WCDMA scheme, an antenna device capable of realizing antenna diversity can be simply provided.

Here, in the antenna device of the eighth embodiment as well, the antenna switching connector of the sixth embodiment may be used. Furthermore, if it is possible to satisfy standards for the radio equipment with an antenna output without the lowpass filters 13 and 25, these may not be provided.

(Ninth Embodiment)

Figure 9:
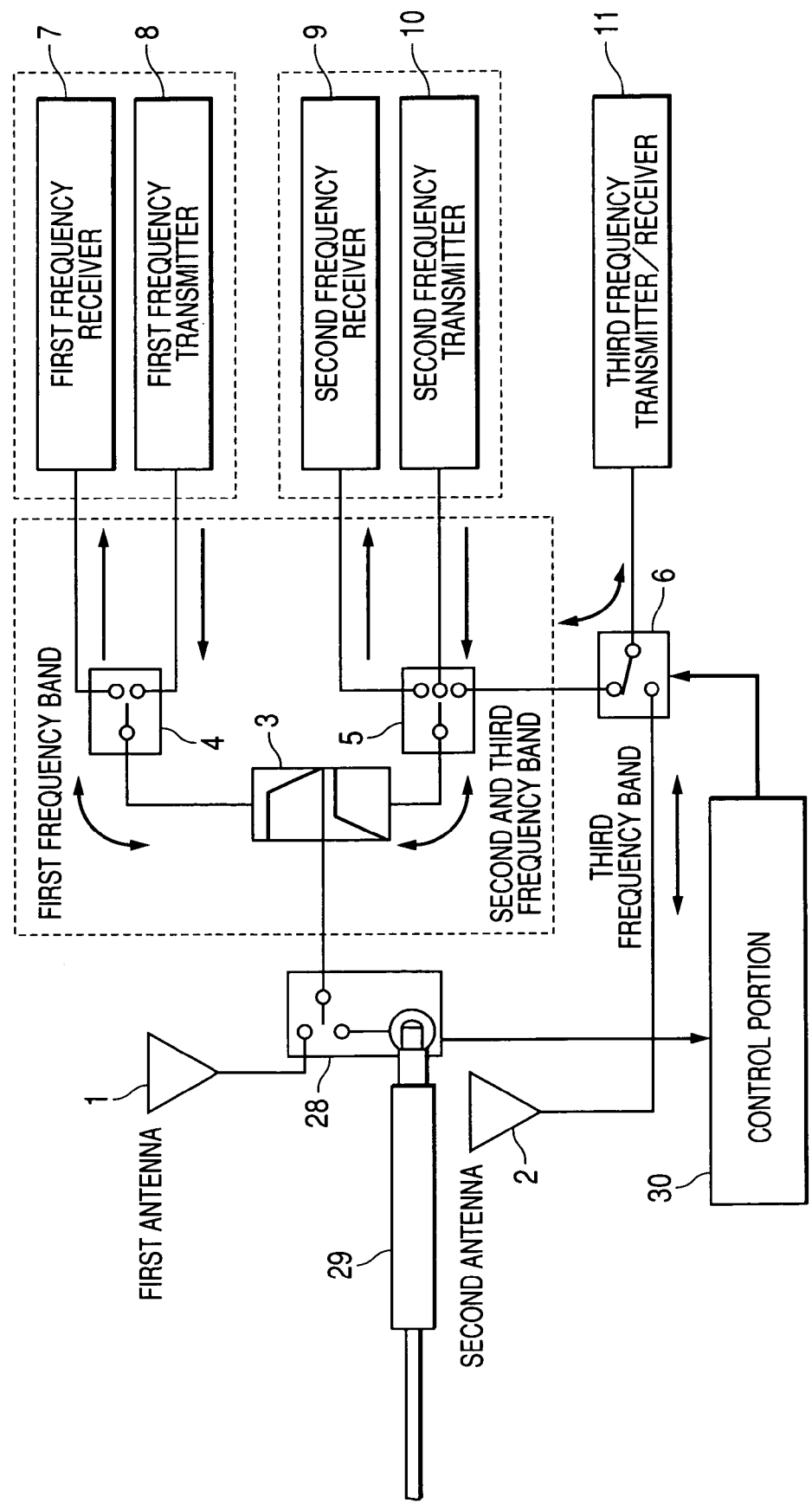
FIG. 9 is a block diagram showing a construction of radio communications equipment to which an antenna device of a ninth embodiment of the present invention has been applied.

FIG. 9 is a diagram showing a construction of radio communications equipment to which an antenna device of a ninth embodiment has been applied. The radio communication equipment of the ninth embodiment is, in addition to having the same construction as that of the second embodiment, provided with, a control portion 30. This control portion 30 (equivalent to a controller described in CLAIMS) has a function to connect a third high-frequency switch circuit 6 to a second high-frequency switch circuit 5 side upon recognizing that a cable plug 29 connected to an external antenna has been attached to an antenna switching connector 28.

Namely, in this radio communications equipment, when signals of the third frequency band are communicated by a third frequency transmitter/receiver 11, if the control portion 30 recognizes that the cable plug 29 connected to an external antenna has been attached to the antenna switching connector 28, the control portion 30 connects the third high-frequency switch circuit 6 to the second high-frequency switch circuit 5 side. In accordance therewith, the second high-frequency switch circuit 5 is connected to the third high-frequency switch circuit 6 side. Accordingly, when the cable plug 29 for an external antenna is attached to the antenna switching connector 28, signals of the third frequency transmitter/receiver 11 are inevitably transmitted to the external antenna. Other operations are the same as those of the second embodiment.

As such, according to the ninth embodiment, two antenna systems corresponding to three frequency bands of frequency bands composed of a conventional dual-band single-mode antenna system and a single-mode antenna system of the third frequency band can be realized without making drastic modifications. Moreover, a reception of signals of the first frequency band and a transmission of signals of the third frequency band can be simultaneously carried out. In addition, for the third frequency band, antenna diversity can be used. Furthermore, a dual-mode/multi-band antenna device which allows using only an external antenna without using the first antenna 1 and second antenna 2 can be simply provided.

Here, the lowpass filters of the third embodiment may be used together with the radio communications equipment of the ninth embodiment. In addition, the first frequency receiver 7 may be composed of a GSM900 receiver, the first frequency transmitter 8 may be composed of a GSM900 transmitter, the second frequency receiver 9 may be composed of a DCS1800 receiver, the second frequency transmitter 10 may be composed of a DCS1800 transmitter, and the third frequency transmitter/receiver 11 may be composed of a WCDMA transmitter/receiver. Furthermore, similar to the sixth embodiment, a receiver for receiving signals of a fourth frequency band and a transmitter may be constructed in combination In addition, the lowpass filters mentioned in the seventh embodiment may be combined. Furthermore, the radio communications equipment may correspond to the GSM900, DCS1800, PCS1900, and WCDMA of the eighth embodiment.

Although the present invention has been described in detail and with reference to the specific embodiments, it is apparent to those skilled in the art that various modifications and changes can be made without departing from the spirit and scope of the present invention.

The present application is on the basis of Japanese Patent Application No. 2002-293822 filed on Oct. 7, 2002, and the contents thereof are herein incorporated by reference.

INDUSTRIAL APPLICABILITY

As has been described above, according to the present invention, an antenna device which corresponds to a plurality of radio communications systems and frequency bands, such as two radio communications systems and three frequency bands, which can simultaneously carry out a reception and a transmission of different radio communications systems, and which is capable of using antenna diversity can be provided by a simple construction.

The invention claimed is:

1. An antenna device comprising:
   a first antenna which is matched with first, second, and third frequency bands;
   a second antenna which is matched with the third frequency band;
   a diplexer which distributes signals received from the first antenna into signals of the first frequency band and signals of the second and third frequency band;
   a first switch unit which selects a first transmitter for transmitting signals of the first frequency band or a first receiver for receiving signals of the first frequency band, and connects the selected one to the diplexer;
   a second switch unit which selects a second receiver for receiving signals of the second frequency band or a second transmitter for transmitting signals of the second frequency band, and connects the selected one to the diplexer; and a third switch unit which selects the second antenna or diplexer, and connects the selected one to a transmitter/receiver for transmitting and receiving signals of the third frequency band.

2. The antenna device as set forth in claim 1, further comprising an antenna switching connector which is provided between the first antenna and the diplexer,
- wherein when an external antenna is attached, the antenna switching connector connects the external antenna to the diplexer instead of the first antenna.

3. The antenna device as set forth in claim 1, further comprising a lowpass filter which is provided at least either between the first switch unit and the first transmitter or between the second switch unit and the second transmitter.

4. The antenna device as set forth in claim 1 wherein:
- the signals of the first frequency band are signals of a 900 MHz band in a GSM scheme;
- the signals of the second frequency band are signals of a 1800 MHz band in a DCS scheme; and
- the signals of the third frequency band are signals of a 2 GHz band in a WCDMA scheme.

5. The antenna device as set forth in claim 1, wherein;
- the first antenna is further matched with a fourth frequency band;
- the diplexer distributes the signals into signals of the first frequency band and signals of the second, third, and fourth frequency bands; and
- the second switch unit selects a second receiver for receiving signals of the second frequency band, a fourth receiver for receiving signals of the fourth frequency band, or a fourth transmitter for transmitting signals of the second or fourth frequency band, and connects the selected one to the diplexer.

6. The antenna device as set forth in claim 5, further comprising an antenna switching connector which is provided between the first antenna and the diplexer,
- wherein when an external antenna is attached, the antenna switching connector connects the external antenna to the diplexer instead of the first antenna.

7. The antenna device as set forth in claim 5, further comprising a lowpass filter which is provided at least either between the first switch unit and the first transmitter or between the second switch unit and the fourth transmitter.

8. The antenna device as set forth in claim 5, wherein:
- the signals of the first frequency band are signals of a 900 MHz band in a GSM scheme;
- the signals of the second frequency band are signals of a 1800 MHz band in a DCS scheme;
- the signals of the third frequency band are signals of a 2 GHz band in a WCDMA scheme; and
- the signals of the fourth frequency band are signals of a 1900 MHz band in a PCS scheme.

9. The antenna device as set forth in claim 2, further comprising a controller which switches the third switch unit so as to connect the transmitter/receiver to the diplexer, when the controller detects that the external antenna is attached to the antenna switching connector,
- wherein signals of the third frequency band are transmitted and received by the external antenna.

10. The antenna device as set forth in claim 6, further comprising a controller which switches the third switch unit so as to connect the transmitter/receiver to the diplexer, when the controller detects that the external antenna is attached to the antenna switching connector,
- wherein signals of the third frequency band are transmitted and received by the external antenna.

* * * * *